US011769352B2

(12) United States Patent
Dos Santos et al.

(10) Patent No.: US 11,769,352 B2
(45) Date of Patent: Sep. 26, 2023

(54) SMART AND SHARED SERVICES PLATFORM

(71) Applicant: Embraer S.A., São José dos Campos (BR)

(72) Inventors: Luís Gustavo Dos Santos, São José dos Campos (BR); Marco Aurelio Silva Vilhena Cesarino, São José dos Campos (BR); Arjan Kanters, Amsterdam (NL); Luís Marcelo Borges, Lewisville, TX (US)

(73) Assignee: Embraer S.A., São José dos Campos (BR)

( * ) Notice: Subject to any disclaimer, the term of this patent is extended or adjusted under 35 U.S.C. 154(b) by 459 days.

(21) Appl. No.: 16/560,459

(22) Filed: Sep. 4, 2019

(65) Prior Publication Data
US 2020/0082644 A1    Mar. 12, 2020

Related U.S. Application Data

(60) Provisional application No. 62/727,670, filed on Sep. 6, 2018.

(51) Int. Cl.
G07C 5/00         (2006.01)
B64D 45/00        (2006.01)

(52) U.S. Cl.
CPC ............ G07C 5/006 (2013.01); B64D 45/00 (2013.01); G07C 5/008 (2013.01); B64D 2045/0085 (2013.01)

(58) Field of Classification Search
None
See application file for complete search history.

(56) References Cited

U.S. PATENT DOCUMENTS 7,440,906 B1 * 10/2008 Wetzer ............... G06Q 10/08
                                                   705/7.26
11,157,973 B2 * 10/2021 Fuchs ............... G06Q 30/0283
(Continued)

FOREIGN PATENT DOCUMENTS

EP      3264340 A1      1/2018
JP      2002157426 A *  5/2002
WO      2009/085476 A1  7/2009

OTHER PUBLICATIONS

Machine translation of JP-2002157426-A (Year: 2002).*
(Continued)

Primary Examiner — Anne Marie Antonucci
Assistant Examiner — Kyle S Park
(74) Attorney, Agent, or Firm — Nixon & Vanderhye P.C.

(57) ABSTRACT

A network of computing devices connected to the central AOG management server execute the process of collecting data from a crew with a maintenance controller, supporting the creation of an unique electronic data package to record the data, submitting a maintenance requests from the server to independent mechanics mobile devices and/or maintenance repair and overhaul (MRO) computing systems for maintenance using the collect data, supporting maintenance control center controller to identify the needed materials for the events, providing visibility of the case solution progress to all parties involved and/or effected and providing ways to retrieve all data related to specific cases and creating analyses and reports to support Vehicles Operators (e.g., Airlines), independent mechanics, MROs (maintenance repair overhaulers), material providers and OEMs to improve their processes to solve events.

19 Claims, 5 Drawing Sheets

(56) References Cited

U.S. PATENT DOCUMENTS

| | | | |
|---|---|---|---|
| 2003/0036939 A1* | 2/2003 | Flores | G06Q 10/06314 705/7.16 |
| 2005/0015292 A1* | 1/2005 | Wilson | G06Q 10/06398 705/7.15 |
| 2008/0159158 A1* | 7/2008 | Poisson | B64D 45/00 370/249 |
| 2010/0241481 A1* | 9/2010 | Apostolides | G06Q 10/06395 705/7.41 |
| 2012/0330855 A1* | 12/2012 | Maxwell | G06Q 10/06 705/320 |
| 2013/0132140 A1* | 5/2013 | Amin | G06Q 40/12 705/7.13 |
| 2016/0042325 A1 | 2/2016 | Avery et al. | |
| 2017/0233105 A1* | 8/2017 | Vali | B64F 5/40 701/3 |
| 2018/0107966 A1* | 4/2018 | Hadad | G06Q 10/063118 |

OTHER PUBLICATIONS

International Search Report and Written Opinion issued in PCT/BR2019/000027 dated Oct. 15, 2019 (8 pages).
International Preliminary Report on Patentability issued in PCT/BR2019/000027 dated Mar. 9, 2021 (7 pages).

* cited by examiner

SMART AND SHARED SERVICES PLATFORM

CROSS-REFERENCE TO RELATED APPLICATIONS

This application claims benefit of U.S. Provisional Application No. 62/727,670 filed Sep. 6, 2018, incorporated herein by reference.

STATEMENT REGARDING FEDERALLY SPONSORED RESEARCH OR DEVELOPMENT

None.

FIELD

The example non-limiting technology is directed to systems and methods which have technical elements for effectively finding maintenance and materials for a Non-Operational Vehicle (NOV) situation. In more detail, the technology herein relates to a system (e.g., a smart and shared services platform—S3P) and a method with technical elements for finding the necessary maintenance resources to reestablish the operation of a defective vehicle. In particular, the technology herein relates to a method to efficiently solve aircraft-on-ground (AOG) situations, regardless of the aircraft type, model or any other operational or design characteristic (e.g., commercial, executive, defense model).

BACKGROUND

As any machine, vehicles may be unavailable for use due to technical failures of one or more systems and components. The causes of these failures may be related to expected material fatigue and other forms of degradation due to normal operational usage in a given environment as well as related to operational accidents or usage outside design limits Unavailability of a vehicle due to such causes may be referred to in general as "downtime" and in particular, for aviation, we can refer to it as an "aircraft on ground" (AOG) situation.

The downtime or AOG of a vehicle may cause different operational and business impacts for an organization. In 2016, the total AOG cost in the world was estimated at $22 billion US ($11.2 billion in the USA and $2.9 billion in Europe). In the USA alone, airlines issue more than 40,000 "on-call" maintenance requests per year to try to solve AOG situations in airports that they operate but where they have limited support (outstations) in comparison with their main operation bases. Depending on the technical failure, a different combination of technicians' skills, total labor, spare parts and consumables may be needed to solve the downtime situation. Often, the ideal list of resources can be defined only after a meticulous initial inspection normally known as "troubleshooting". Therefore, it is important to support vehicle operators in general and aircraft operators in particular to reduce downtime and AOG events.

In order to reduce the costs and consequences of vehicle downtime, original equipment manufacturers (OEMs) 708 are increasing the number and variety of vehicle health monitoring solutions. For example, aircraft operators can have their aircraft "health" continuously monitored by electronic solutions. When there is need for maintenance, commercially available software solutions allow vehicle operators to identify if they have parts and consumables in their stocks to solve the root cause of downtime or AOG. Additionally, they can access parts e-marketplaces to request material they do not have on hand. These and other specific solution may also entitle their users to have access to services such as tracking of the parts sent to solve an AOG or options to reduce the time these parts will arrive at the designated location. Finally, vehicle operators may establish contact with local maintenance services suppliers close to their outstations in order to ensure mechanics will be able to attend to an AOG or downtime event when necessary.

One prior solution proposed an integrated support system for aircraft fleet management comprising a system operable to receive data downloaded from an aircraft, process said data to infer a status of at least one aircraft system and display maintenance information relative to the status via an interactive electronic technical manual (IETM) which displays an availability of a part identified in the IETM in a supply chain. Another prior proposal was a method for managing the maintenance and materials for an aircraft fleet comprising operating on a network of computing devices and executing with an integrated maintenance and materials service (IMMS) program instructions to collect aircraft on-board systems data and submitting a plurality of parts requests to a plurality of part supplier computing systems for parts and submitting a plurality of maintenance requests to a plurality of maintenance repair and overhaul computing systems for maintenance.

For these and similar proposals, a clear disadvantage is that any failure that cannot be identified automatically from the downloaded aircraft data cannot be correlated with a given component to be replaced or the necessary maintenance procedure and consequently, cannot be located and ordered in a supply chain. Additionally, these solutions require a high degree of computing systems integration among aircraft, airlines, parts suppliers and maintenance repair and overhaul organizations, which will make the development and expansion of the network more difficult, preventing medium to small organizations as well as independent professionals (e.g., mechanics) from participating.

The above mentioned and other similar solutions do not provide the means that explore the potential benefits of the network effects on a platform that could connect people, organizations and the different resources in an interactive environment in which demand and supply of products and services could be efficiently matched on a global scale and value could be created and exchanged among the involved parties.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EMBODIMENTS

Figure 1:
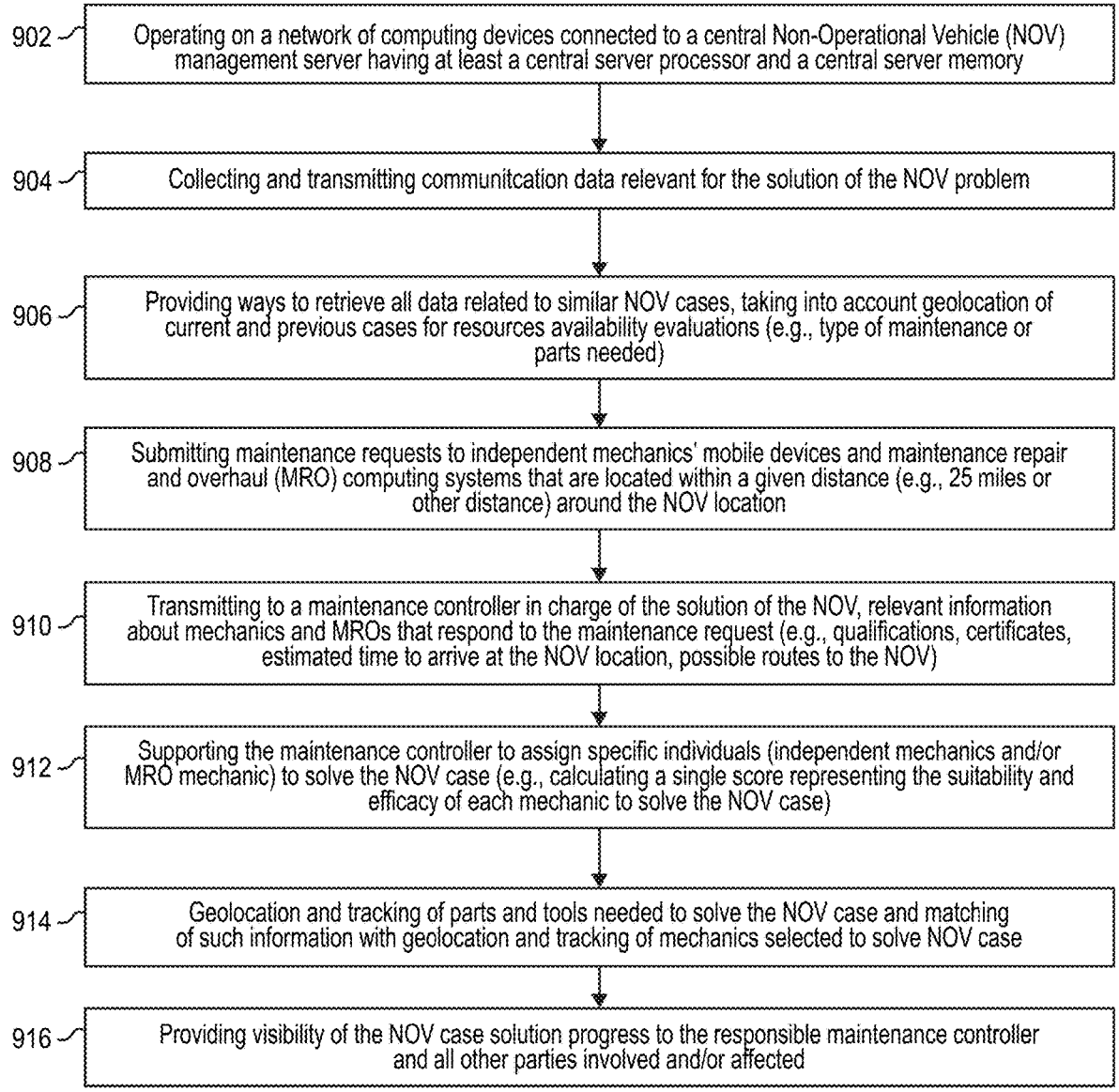
FIG. 1 shows an example non-limiting computer-operated process.

A non-limiting example "Smart & Shared Services Platform" (S3P) provides a system and a method which have technical elements for effectively managing maintenance human resources and materials to solve vehicle unavailability caused by any failure of vehicle hardware (physical) or software components and/or systems. The example non-limiting technology herein provides an overall computer-implemented process as shown in FIG. 1:

- Operating on a network 710 (e.g., Secure Internet) of computing devices connected to a central Non-Operational Vehicle (NOV) management server having at least a central server processor and a central server memory (block 902);
- Collecting and transmitting communication data relevant for the solution of the NOV problem (block 904) to ground stations and mobile stations (see FIG. 1B);
- Providing ways to retrieve all data related to similar NOV cases, considering geolocation of current and previous cases for resources availability evaluations (e.g., type of maintenance or parts needed) (block 906);
- Submitting maintenance requests to independent mechanics' mobile devices and maintenance repair and overhaul (MRO) computing systems that are located within a given distance (e.g., 25 miles or other distance) around the NOV location (block 908);
- Transmitting to a maintenance controller in charge of the solution of the NOV, relevant information about mechanics and MROs that respond to the maintenance request (e.g., qualifications, certificates, estimated time to arrive at the NOV location, possible routes to the NOV) (block 910);
- Supporting the maintenance controller to assign specific individuals (independent mechanics and/or MRO mechanic) to solve the NOV case (e.g., calculating a single score representing the suitability and efficacy of each mechanic to solve the NOV case) (block 912);
- Geolocation and tracking of parts and tools needed to solve the NOV case and matching of such information with geolocation and tracking of mechanics selected to solve NOV case (block 914); and
- Providing visibility of the NOV case solution progress to the responsible maintenance controller and all other parties involved and/or effected (block 916).

Figure 1A:
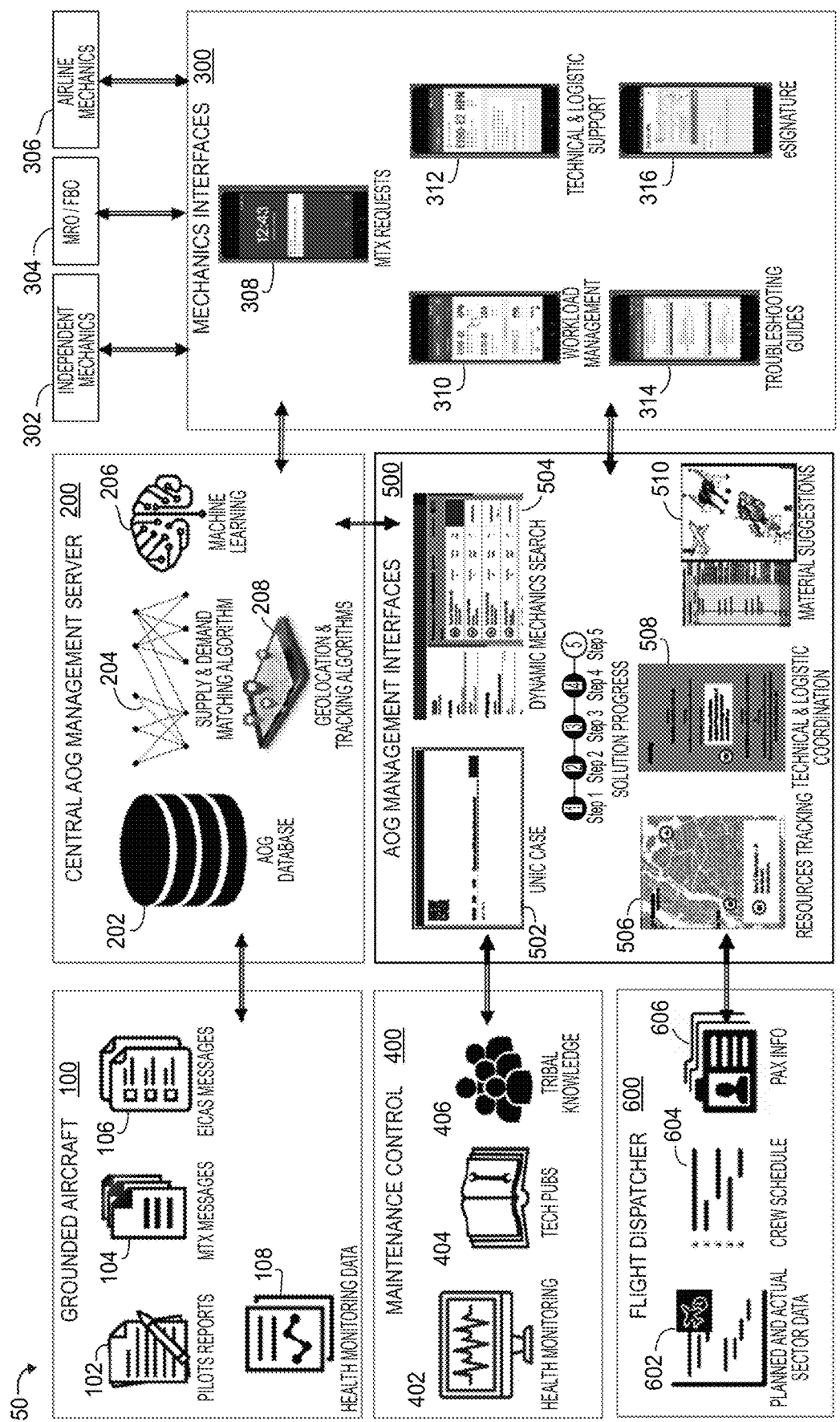
FIG. 1A is a schematic block diagram of an example non-limiting smart and shared services platform (S3P)
Figure 1B:
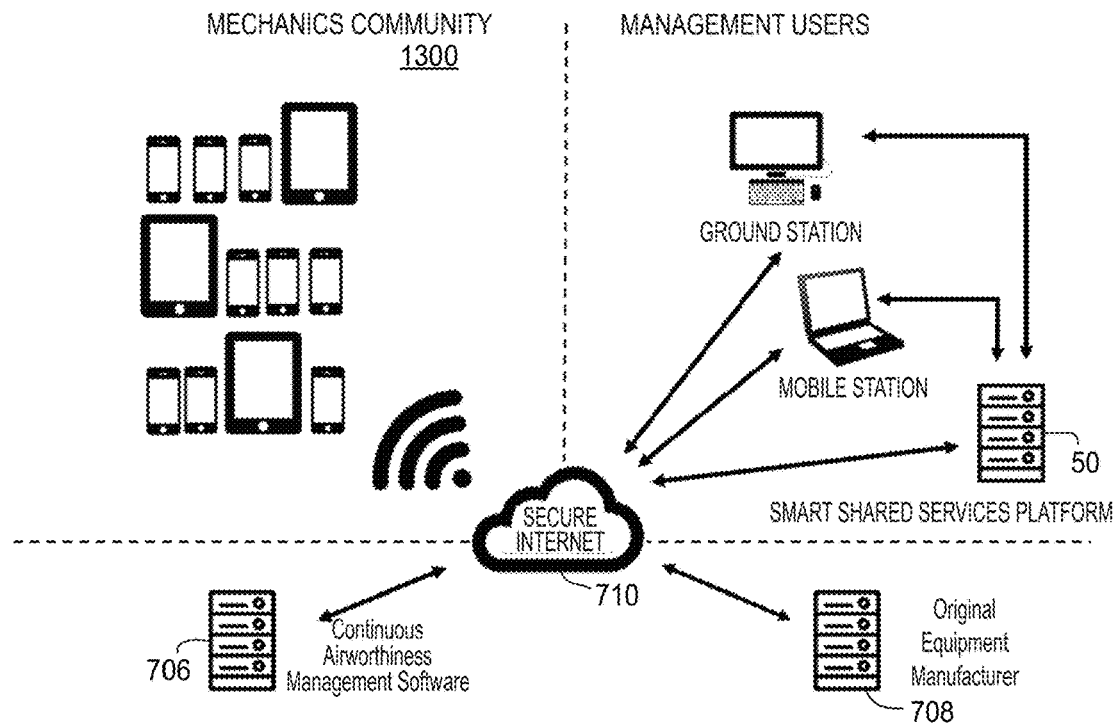
FIG. 1B is a schematic block diagram of the smart and shared services platform (S3P) network infrastructure.

FIG. 1A shows an example non-limiting embodiment of an example smart shared services platform (system) 50. System 50 includes a grounded aircraft 100, a central AOG management server 200, a mechanics interface 300, a maintenance control 400, AOG management interfaces 500, and a flight dispatcher 600. Grounded aircraft 100 communicates with the central AOG management server 200, which communicates with mechanics interfaces 300 and AOG management interfaces 500. The AOG management interfaces 500 communicate with maintenance control 400 and a flight dispatcher 600, and also with the mechanics interfaces 300.

In the example shown, the AOG management server 200 comprises one or more processors executing instructions stored in non-transitory memory. The AOG management server 200 in this embodiment includes an AOG database 202 and may execute algorithms such as supply and demand matching algorithm 204, machine learning 206, and geolocation and tracking algorithms 208.

The grounded aircraft 100 communicates various information to the AOG management server 200 such as pilots reports 102, MTX messages 104, Engine Indicating and Crew Alerting System (EICAS) messages 106, and health monitoring data 108.

The AOG management server 200 communicates with the mechanics interfaces 300 such as MTX requests 308, workload management 310, technical and logistic support 312, troubleshooting guides 314, and esignatures 316. Such mechanics interfaces 300 can be provided by independent mechanics 302, MRO/FBOs 304, and airline mechanics 306.

The AOG management server 200 and the mechanics interfaces 300 communicate with AOG management interfaces 500 such as UNIC case 502, dynamic mechanics search 504, resources tracking 506, technical and logistic coordination 508, and material suggestions 510.

The AOG management interfaces 500 communicate with maintenance control 400 health monitoring 402, technical publications 404 and tribal knowledge 406. AOG management interfaces 500 also communicates with flight dispatcher 600 including planned and actual sector data 602, crew scheduler 604, and fax information 606.

The example non-limiting technology comprises operating on a network of computing devices connected to the central NOV management server (CNOVMS) 200 and running a method to execute the process of collecting and communication data from NOV crew with the maintenance controller 400, supporting the creation by the maintenance controller of an unique electronic data package (case) to record the NOV data, submitting a plurality of maintenance requests from the CNOVMS to a plurality of independent mechanics mobile devices ("mechanics community") 1300 and/or a plurality of maintenance repair and overhaul (MRO) computing systems for maintenance using the collect NOV data, supporting maintenance control center controller to identify the needed materials for the NOV events, providing visibility of the NOV case solution progress to all parties involved and/or effected and providing ways to retrieve all data related to specific NOV cases and creating analyses and reports to support Vehicles Operators (e.g., Individual owners, Airlines), independent mechanics, MROs, material providers and OEMs to improve their processes to solve NOV events (e.g., time and cost reductions, lower impacts on operations).

The example non-limiting technology comprises a multimodal communication channel with the specific individuals assigned to an NOV case for technical and logistic coordination, allowing all the data related to the textual, aural, linguistic, spatial, and visual resources used to compose messages to be recorded and organized by the CNOVMS 200, which includes supporting the maintenance control center controller to track the spatial displacement of the assigned individuals towards the NOV event location, including but not limited to visualizing symbols in a map representing each individual, colored lines highlighting routes being used in the displacement, information about estimated time of arrival at the destination based on current location, speed, route and transport type).

One aspect of the example non-limiting technology is to transmit to the maintenance control center controller 400 previous actions stored in the central server memory of the CNOVMS taken in the attempt to solve similar NOV events (similarity on one or more aspects such as, but not limited to: vehicle type, model, serial number, failure code), indicating (when applicable), what materials were necessary to solve the NOV, including the ranking of previous actions in the attempt to solve similar NOV events based on how successful they were to solve the NOV.

According to another aspect of the example non-limiting technology, it displays the amount of progress of the NOV solutions process by different methods, including but limited to: a) percentage of completion of each task or step of the process, b) "solutions progress bar" 511 of each task or step of the process, c) percentage of completion of group or groups of tasks/steps of the process, d) "progress bar" of group or groups of tasks/step of the process. The display of the progress on the NOV solution is generated on the central server processor of the central NOV management server based on data stored in the central server memory and collected from the all interfaces of the CNOVMS involved with the NOV (e.g., the mobile devices of the mechanics).

Figure 2:
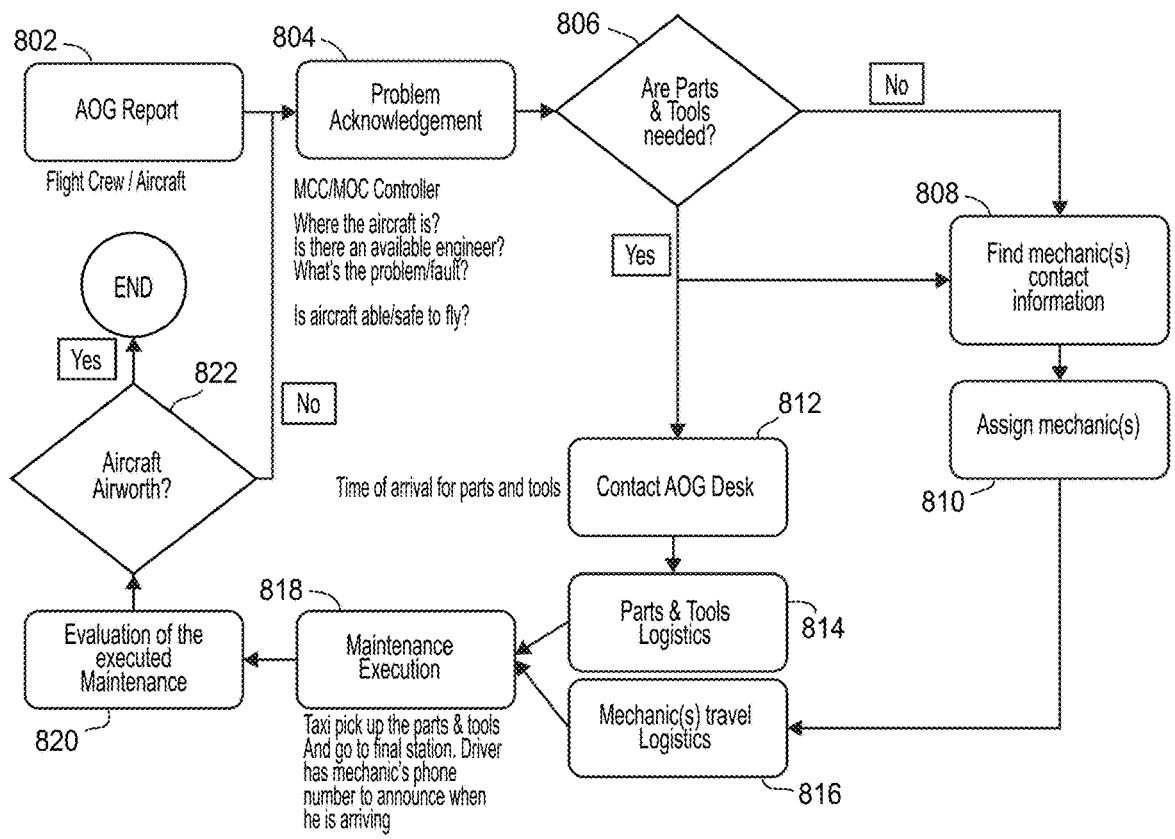
FIG. 2 is a schematic view of an exemplary non limiting process where the smart and shared services platform (S3P) can be used.
Figure 3:
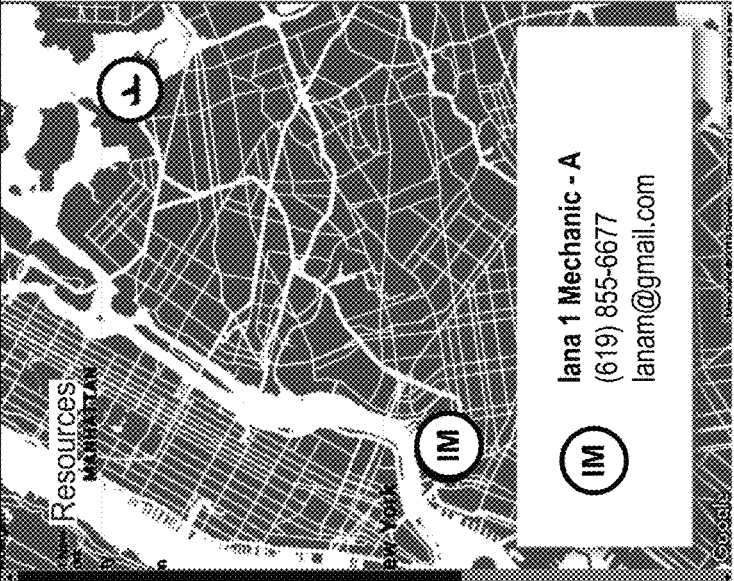
FIG. 3 is a screenshot of an example non-limiting management interface.
Figure 4:
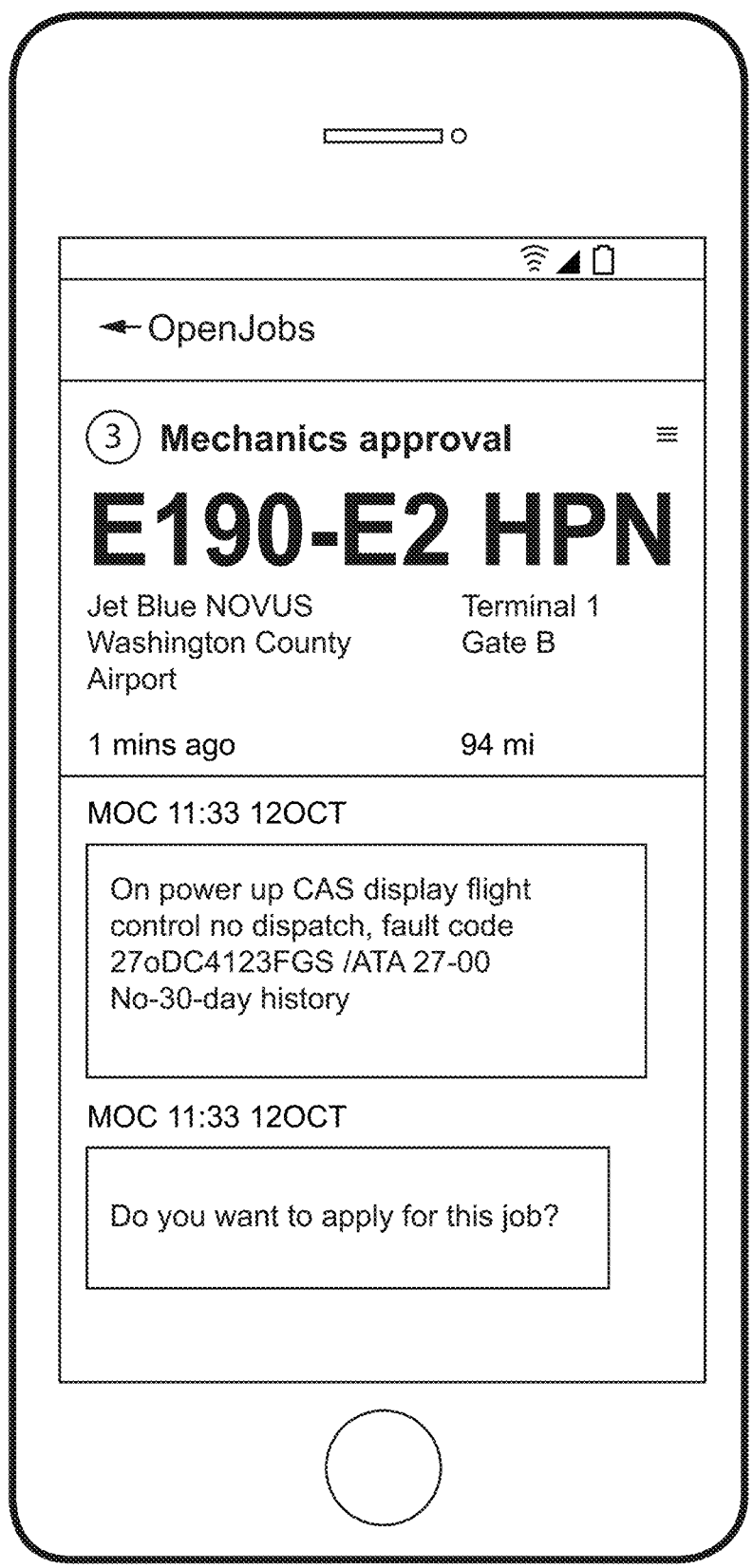
FIG. 4 is a screenshot of an example non-limiting mechanic's interface.

FIG. 2 shows an example non-limiting process 800. In one possible scenario, an aircraft on ground reports a problem (block 802) to a Continuous Airworthiness Management Software ("CAMS") 706 which the Central AOG Management Server ("AOG server") 200 and maintenance control 400 acknowledges (block 804). The AOG server 200 and/or maintenance control determines whether parts and tools are needed to solve the reported problem (block 806). If parts and/or tools are needed ("yes" exit to decision block 806), the AOG server 200 or maintenance control 400 uses the AOG management interfaces 500 to arrange for parts and tools (blocks 812, 814). Whether or not parts and/or tools are needed, the AOG server uses the mechanics interfaces 300 to find mechanics contact information (block 808) and solicit and assign mechanics (block 810) (see FIGS. 3 & 4). The AOG server 200 or maintenance control 400 can also arrange travel for the mechanics (block 816). The mechanics perform maintenance (block 818). The work is evaluated (block 820) to determine whether it is airworthy (block 822). If the aircraft is not airworthy ("No" exit to block 822), the process is repeated to solve a next phase of the problem.

Such processes may include in some non-limiting embodiments:

searching all independent mechanics and maintenance repair and overhaul (MRO) mechanics that are located inside a given distance radius (e.g., 25 miles or other distance) around the correspondent location of NOV event, using geolocation information from their mobile devices and availability status;

means to expand the searching radius of independent mechanics and maintenance repair and overhaul (MRO) mechanics around the correspondent location of NOV event, using geolocation information from their mobile devices;

collecting information related, but not limited to, the readiness (as the state of being prepared to address the NOV situation (e.g., qualifications, certificates), the willingness and the promptness to do so, of a plurality of independent mechanics and a plurality of maintenance repair and overhaul (MRO) mechanics to be assigned to the NOV event;

supporting the maintenance controller to assign the NOV case for specific individuals (independent mechanics and/or MRO mechanics);

automatic classification of the availability of all independent mechanics and MRO mechanics that are located inside a given distance radius around the correspondent location of NOV event, using availability information from their mobile devices (e.g., "off-duty switch") and job assignment information from the central NOV management server and in some embodiments using artificial intelligence and/or machine learning;

means for the MRO automatically and remotely attribute availability status values to each of their mechanics (individually or in groups), such as but not limited to: off-duty, available, and unavailable; and tracking the dispatched mechanics and means to inform the maintenance controller that assigned individuals reached a given distance to the NOV location (e.g., 2 miles), using geolocation information from their mobile devices, and allowing detailed coordination to access NOV area.

The system and method of the example non-limiting technology of the preceding paragraphs can be used for effectively finding the maintenance and materials to solve downtime situations for any vehicle, equipment or machinery that may fail unexpectedly during operation.

All documents cited above are incorporated herein by reference as if expressly set forth.

While The example non-limiting technology has been described in connection with what is presently considered to be the most practical and preferred embodiments, it is to be understood that The example non-limiting technology is not to be limited to the disclosed embodiments, but on the contrary, is intended to cover various modifications and equivalent arrangements included within the spirit and scope of the appended claims.

The invention claimed is:

1. A computer-implemented method for an aircraft repair management server configured to automatically coordinate repair of a non-operational aircraft among a multiplicity of computerized support systems, the aircraft repair management server including a database and a supply-and-demand matching engine, the method comprising:

automatically performing operations with at least one processor communicating over at least one computer network with at least:

an electronic system on board the non-operational aircraft, a mechanics mobile device gateway providing real time two-way electronic communications with mobile devices associated with aircraft mechanics, a maintenance controller providing parts and tools procurement, and a flight dispatcher computer, the at least one processor providing a networked platform connecting and exchanging data with the electronic system on board the non-operational aircraft, the mechanics mobile device gateway, the flight dispatcher computer and the maintenance controller in a real time interactive environment, with the management server automatically matching demand and supply of products and services to automatically coordinate repair of the non-operational aircraft, the at least one processor performing automatic operations comprising:

(a) electronically receiving at least one problem report message from the electronic system on board the non-operational aircraft, the message including an engine indicating and crew alerting system (EICAS) message and aircraft health monitoring data, the at least one problem report message including aircraft type, aircraft location and a fault code;

(b) processing the at least one received problem report message to determine tools and/or parts needed to repair the non-operational aircraft, including accessing a historical database based on the aircraft type and the failure code to determine tools and/or parts and actions previously re quire d to solve the same or similar aircraft fault, and initiating real time electronic communications over the at least one computer network to arrange for the provision of such determined tools and/or parts to the location of the non-operational aircraft;
(c) in response to the received at least one problem report message and based on the location of the non-operational aircraft, dynamically searching for a mechanic with skills and location to repair the non-operational aircraft, including;
(c1) automatically and remotely determining availability status values of e ach of plural mechanics determined by a dynamic search to be within geographical proximity to the location of the non-operational aircraft, and
(c2) calculating a score representing suitability of each of the plural mechanics having status values indicating availability to repair the non-operational aircraft based on mechanic skill qualifications and estimated time required for each said plural mechanic to travel to the location of the non-operational aircraft;
(d) based on the calculated score, using the mechanics mobile device gateway to contact a mobile device associated with a selected one of the plural mechanics, communicating information concerning the aircraft location, aircraft type and failure code to the mobile device associated with the selected mechanic, confirming that the selected mechanic agrees to repair the non-operational aircraft, and in response to the confirmation, arranging for the selected mechanic to travel to the non-operational aircraft location; and
(e) in response to geolocation information received from the mobile device associated with the selected mechanic, tracking travel of the selected mechanic and providing to the electronic system on board the non-operational aircraft, a notification of the contacted mechanic's proximity and/or estimated time of arrival to the location of the non-operational aircraft; and
(f) electronically publishing over the network to the electronic system on board the non-operational aircraft and to the flight dispatcher computer, a progress indicator providing ongoing visibility of the non-operational aircraft repair progress.

2. The method of claim 1 wherein using the mechanics mobile device interface gateway to contact the mobile device comprises sending an electronic text message to the mobile device.

3. The method of claim 1 wherein the arranging for the selected mechanic to travel to the non-operational aircraft location comprises arranging for and/or synchronizing transportation for the selected mechanic.

4. The method of claim 3 wherein the arranging further comprises continually tracking location of the selected mechanic as the selected mechanic travels to the location of the non-operational aircraft.

5. The method of claim 4 wherein the tracking location of the selected mechanic as the selected mechanic travels to the non-operational aircraft includes informing a crew of the non-operational aircraft of the current location of the selected mechanic and the estimated arrival time of the selected mechanic to the location of the non-operational aircraft.

6. The method of claim 1 wherein the electronic system on board the non-operational aircraft reports the at least one problem report message including the fault code electronically to the server using an Engine Indicating and Crew Alerting System (EICAS) and electronic message transmit (MTX) capabilities.

7. The method of claim 1 wherein the arranging includes mapping location of the selected mechanic in real time in response to geolocation information received via the gateway from the mobile device associated with the selected mechanic.

8. The method of claim 1 further comprising executing, with the processor, a supply and demand matching algorithm, machine learning, and geolocation and tracking algorithms.

9. The method of claim 1 further including the processor communicating automatically over a multimodal communication channel with specific individuals assigned to the non-operational aircraft for technical and logistic coordination, and recording and organizing data related to the textual, aural, linguistic, spatial, and visual resources used to compose messages.

10. A smart and shared services computer platform for coordinating repair of a non-operational aircraft comprising a server including at least one processor operatively connected to communicate over at least one computer network with at least one electronic system on board the non-operational aircraft, a mechanics mobile device gateway, a maintenance control computer system and a flight dispatcher computer, the at least one processor configured to perform instructions to provide a networked platform connecting to the non-operational aircraft electronic system, the mechanics mobile device gateway, the flight dispatcher computer and the maintenance control computer system in an interactive environment, the server being configured to match demand and supply of products and services useful to repair the non-operational aircraft, the instructions including:
(a) instructions configured to electronically receive at least one problem report message from the non-operational aircraft electronic system, the at least one problem report message including non-operational aircraft type, non-operational aircraft location and a fault code;
(b) instructions configured to process the received at least one problem report message to determine what tools and/or parts are needed to make the non-operational aircraft operational, including accessing a historical database based on the aircraft type and the failure code to determine tools and/or parts and actions previously used to solve the non-operational aircraft fault;
(c) instructions configured to, when the processing reveals tools and/or parts are needed, initiate real time electronic communications over the at least one computer network to arrange for the provision of such tools and/or parts to the location of the non-operational aircraft;
(d) instructions configured to, in response to the at least one received problem report message, use the gateway to contact a mobile device associated with a mechanic having skills suited to repair the non-operational aircraft and arrange for the mechanic to make the non-operational aircraft operational, including:
instructions to automatically perform a dynamic search based at least in part on geographic proximity to determine status values indicating availability of each of plural mechanics determined by the dynamic search to be within geographical proximity to the non-operational aircraft location;
instructions to calculate a score representing suitability of each of the geographically-proximate mechanics showing available status, to repair the non-operational aircraft based in part on geolocation provided by mechanic mobile devices, the calculated score taking into account availability status values, mechanic skill qualifications, and estimated time to travel to the location of the non-operational aircraft;

instructions to, based on the calculated score, select and contact a selected mechanic, communicate the aircraft location, aircraft type and failure code to the mobile device associated with the selected mechanic, confirming that the selected mechanic agrees to repair the non-operational aircraft, and in response to the confirmation, arranging for the mechanic to travel to the non-operational aircraft; and instructions to use geolocation of the mobile device associated with the selected mechanic, to track travel of the selected mechanic and provide, to the non-operational aircraft electronic system, a notification concerning the selected mechanic's proximity and/or estimated time of arrival to the non-operational aircraft; and (e) instructions configured to electronically publish over the at least one computer network to the non-operational aircraft electronic system and to the flight dispatcher computer, a progress indicator providing ongoing visibility into repair progress of the non-operational aircraft.

11. The platform of claim 10 wherein the contacting comprises sending an electronic text message to the mobile device associated with the selected mechanic.

12. The platform of claim 10 wherein the arranging comprises arranging transportation for the selected mechanic to travel to the location of the non-operational aircraft.

13. The platform of claim 12 wherein the arranging further comprises tracking location of the selected mechanic relative to the location of the non-operational aircraft and providing updates of the tracked location to the non-operational aircraft electronic system and to the flight dispatcher computer.

14. The platform of claim 10 wherein the arranging comprises tracking location of the selected mechanic as the selected mechanic travels to the non-operational aircraft, and informing the non-operational aircraft electronic system of estimated arrival time of the selected mechanic.

15. The platform of claim 10 wherein the non-operational aircraft electronic system sends the at least one problem report message electronically using an Engine Indicating and Crew Alerting System (EICAS).

16. The platform of claim 10 wherein the arranging includes mapping location and/or tracking location of additional resources needed to repair the non-operational aircraft.

17. The platform of claim 10 wherein the electronically publishing comprises electronically publishing a graphical display that displays a progress bar graphically showing percentage completion of a group or groups of tasks/steps of a repair process.

18. The platform of claim 10 wherein the processor is further configured to execute a supply and demand matching algorithm, machine learning, and geolocation and tracking algorithms.

19. The platform of claim 10 wherein the processor is configured to communicate automatically over a multimodal communication channel with specific individuals assigned to the non-operational aircraft for technical and logistic coordination, to record and organize data related to the textual, aural, linguistic, spatial, and visual resources used to compose messages.

* * * * *